P. SHAW.
Butter-Worker.
No. 167,475. Patented Sept. 7, 1875.
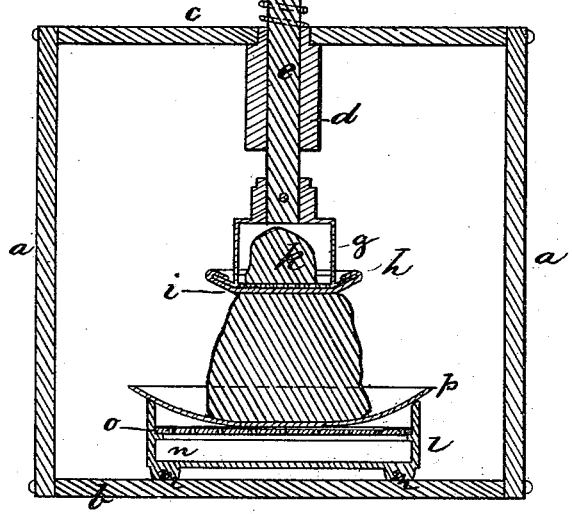
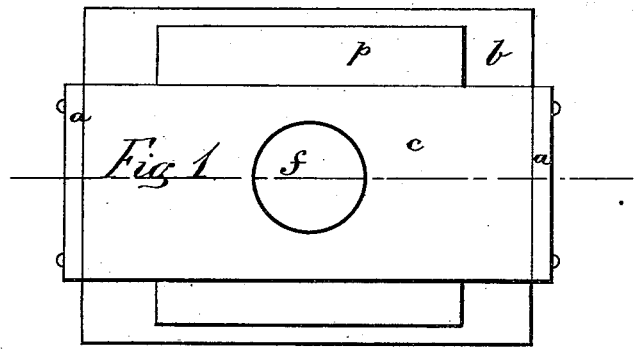
Witnesses:
John R. Heard
Francis Allen
Inventor:
Philander Shaw.
by Alban Andrén
his atty

UNITED STATES PATENT OFFICE.

PHILANDER SHAW, OF SCITUATE, MASSACHUSETTS.

IMPROVEMENT IN BUTTER-WORKERS.

Specification forming part of Letters Patent No. 167,475, dated September 7, 1875; application filed March 20, 1875.

*To all whom it may concern:*

Be it known that I, PHILANDER SHAW, of Scituate, in the county of Plymouth and State of Massachusetts, have invented certain new and useful Improvements in Butter-Working Apparatus; and I do hereby declare the following to be a full, clear, and exact description of the invention, such as will enable others skilled in the art to which it pertains to make and use it, reference being had to the accompanying drawings, which form part of this specification.

My invention relates to improvements in apparatus for the purpose of working out the surplus buttermilk and water from butter after it comes from the churn, as well as for the purpose of mixing the butter with the required amount of salt; and this, my invention, consists in the employment of a portable receptacle for ice that is covered with a perforated detachable cover, to the upper side of which is attached some suitable porous material, such as cloth, wash-leather, &c., and an up and down movable head, operated by means of hand, foot, or machine power, which head is also provided with a perforated plate that is covered on the under side with a suitable porous material. The said head is made hollow, so as to form a receptacle for ice, or a sponge according to the temperature of the atmosphere. The aforesaid head is attached to the lower end of a rod that is movable up and down in a suitable bearing or bearings, located in a frame-work, as will now be more fully shown and described.

On the accompanying drawing, Figure 1 represents a ground plan of my invention, and Fig. 2 represents a central longitudinal section on the line A B, shown in Fig. 1.

Similar letters refer to similar parts wherever they occur on the drawings.

$a\ a$ represent two uprights secured in their lower ends to the platform $b$, and in their upper ends to the cross-bar $c$, as shown in Fig. 2. The cross-piece $c$ is provided with a sleeve or bearing, $d$, through which the rod $e$ can be moved easily up and down by applying pressure on the top $f$, either directly or by the employment of suitable connecting mechanism to a crank or treadle lever or equivalent devices. To the lower end of the rod $e$ is attached the head $g$ that is provided with a perforated plate, $h$, as shown, over which a piece of cloth, wash-leather, or suitable porous material, $i$, is attached. The head $g$ is made hollow, so as to form a receptacle for the sponge $k$ that is used for the purpose of absorbing the moisture from the butter during the operation of my improved apparatus. $l$ represents the portable work-table, provided on its under side with legs or casters $m\ m$, and having a receptacle, $n$, located beneath a detachable perforated plate or cover, $o$, as shown, to the upper side of which is attached a piece of cloth or suitable material. A larger piece of cloth, wash-leather, or similar porous material, $p$, is attached to the middle of the aforesaid cloth in a manner as shown in Fig. 2. The receptacle $n$ serves to contain ice, so as to keep the butter, resting on the sheet $p$ at a low temperature during the operation of working it.

The operation of my improved butter-working apparatus is as follows: The butter, after leaving the churn, is placed on the sheet $p$, and the rod $e$ is moved up and down, so that the butter is intermittently pressed between the lower part of the head $g$ and the porous material $p$, resting on the hollow perforated work-table $l$. The moisture is thus gradually worked out from the butter, and is partially absorbed by the sponge $k$ above and precipitated into the receptacle $n$ through the cloth-covered perforated plate $o$. The porous materials $i$ and $p$ prevent the butter from being forced through them into the receptacle above and below said porous materials.

The object of the perforated plate $h$ in the head $g$ is to allow the moisture to escape from the butter and to prevent a vacuum from being formed between the butter and the presser $g$.

During the operation the work-table $l$ is moved on the plate or floor $b$, so as to bring all parts of the butter under the pressure of the head $g$.

The operation of my machine is as follows: The butter, as taken from the churn, is placed upon the cloths covering the perforated plate of the ice-chamber $n$. The head is then forced down upon it repeatedly until the butter is plated out into a thin sheet upon the upper cloth. The operator then raises one side of the butter and doubles it over by taking hold of the upper cloth $p$ without touching the butter with the hands. The other sides are then doubled over in the same manner, thereby forming the butter into a thick lump to be again plated out thin as before, the same process being repeated until the buttermilk is all worked out without touching the butter with the hands. Two cloths are found necessary on the perforated plate $o$ to enable the operator to work the butter easily and to prevent its adhesion to the cloth, the lower cloth being attached to the perforated plate $o$ at its outer edges, and the upper cloth $p$ being attached to the lower cloth near its center, whereby the upper one is free to be moved up and down without being drawn out of its central position on the perforated plate.

I am aware of the patent granted in Great Britain to Thomas Thompson, March 12, 1858, No. 500, for improvements in cheese-presses, and I do not claim as my invention the arrangement as therein set forth; but What I wish to secure by Letters Patent, and claim, is—

1. The improved butter-working apparatus, as herein shown, consisting of the frame $a\ b\ c$, portable work-table $l\ m\ n\ o\ p$, and the reciprocating head $g\ h\ i$, for the purpose and in the manner set forth.

2. The reciprocating hollow head $g$, with its perforated bottom $h$ and covering $i$, as and for the purpose set forth.

3. In combination with the work-table $l$, its receptacle $n$ and perforated plate $o$ of a lower cloth attached to the outer edge of the plate $o$ and an upper cloth, $p$, secured to or near the center of the said lower cloth, substantially as and for the purpose described.

In testimony that I claim the foregoing I have hereunto set my hand this 16th day of March, 1875.

PHILANDER SHAW.

Witnesses:
ALBAN ANDRÉN,
JOHN R. HEARD.